US008931787B2

(12) United States Patent
Crawford et al.

(10) Patent No.: US 8,931,787 B2
(45) Date of Patent: Jan. 13, 2015

(54) SUPPORT CART FOR INDUSTRIAL MACHINE SCREW

(71) Applicant: Asahi Kasei Plastics North America, Inc., Fowlerville, MI (US)

(72) Inventors: Kevin W. Crawford, Gaines, MI (US); Derrick Gene Colon, Monroe, MI (US)

(73) Assignee: Asahi Kasei Plastics North America, Inc., Fowlerville, MI (US)

( * ) Notice: Subject to any disclaimer, the term of this patent is extended or adjusted under 35 U.S.C. 154(b) by 119 days.

(21) Appl. No.: 13/836,461

(22) Filed: Mar. 15, 2013

(65) Prior Publication Data

US 2014/0117638 A1 May 1, 2014

Related U.S. Application Data

(60) Provisional application No. 61/719,756, filed on Oct. 29, 2012.

(51) Int. Cl.
*B62B 1/00* (2006.01)
*B62B 3/10* (2006.01)

(52) U.S. Cl.
CPC .................................... *B62B 3/10* (2013.01)
USPC .................. 280/79.11; 280/47.24; 280/47.34

(58) Field of Classification Search
CPC .............. B62B 1/00; B62B 5/00; B62B 7/04; B62B 3/00
USPC ............ 280/79.11, 79.3, 47.24, 47.34, 47.36, 280/47.17, 43.16
See application file for complete search history.

(56) References Cited

U.S. PATENT DOCUMENTS

| | | | | |
|---|---|---|---|---|
| 2,904,308 | A * | 9/1959 | Vergara | 254/8 R |
| 4,033,597 | A * | 7/1977 | Boyer | 280/46 |
| 4,277,075 | A * | 7/1981 | Shay | 280/47.36 |
| 5,879,021 | A * | 3/1999 | Papendick | 280/638 |
| 7,059,616 | B2 * | 6/2006 | Wu | 280/47.24 |
| 7,163,214 | B1 * | 1/2007 | Bratton, Sr. | 280/79.11 |
| 7,311,487 | B1 * | 12/2007 | Crossley et al. | 414/331.06 |
| 8,794,899 | B2 * | 8/2014 | Cozza et al. | 414/458 |

* cited by examiner

*Primary Examiner* — Hau Phan
(74) *Attorney, Agent, or Firm* — Dykema Gossett PLLC

(57) ABSTRACT

A support cart for a machine screw may comprise a frame and a plurality of trolleys. The frame may have a pair of tracks and a caster assembly. The caster assembly may have a first position where the frame does not contact a surface, such as a floor, allowing the frame to be movable. The caster assembly may also have a second position which allows the frame to contact the surface, such as a floor, rendering the frame to be substantially stationary. The plurality of trolleys may include a base, an adjuster, a support bracket, and a plurality of rollers. The trolleys may be movable along the tracks of the frame via the plurality of rollers. A height position of the support bracket may be adjustable relative to the base via the adjuster.

20 Claims, 9 Drawing Sheets

SUPPORT CART FOR INDUSTRIAL MACHINE SCREW

CROSS-REFERENCE TO RELATED APPLICATIONS

This application claims the benefit of U.S. Provisional Application Ser. No. 61/719,756, filed Oct. 29, 2012, the disclosure of which is incorporated herein by reference in its entirety.

TECHNICAL FIELD

The present disclosure relates to support structures for assisting in the removal and cleaning of industrial machining components such as, for example, machine screws.

BACKGROUND

Industrial machines, such as but not limited to, extruders or injection molding machines may make plastic objects from plastic resin pellets. The pellets may be placed in a hopper and may enter one end of a barrel of the industrial machine. A screw may rotate in the barrel. The pellets may be melted by friction of the rotating screw and a heated wall of the barrel. The rotating screw can also mix the pellets, which may be beneficial for making colored plastic objects.

Over time, maintenance of the screw and barrel may be required. In order to clean the screw and/or barrel, the screw may be removed from the barrel, which may be referred to as a changeover. Screws used in industrial machines may be very hot, long, large, and/or heavy. As a result, the removal of the screw from the barrel may take significant time and require significant manual labor. Once the screw is removed from the barrel, the screw and/or barrel may need to be cleaned. The cleaning process and/or general maintenance of the screw and barrel performed during the changeover may also be time-consuming and ergonomically challenging for operators.

It would be desirable to have a support cart that, among other things, is portable and adjustable to accommodate various industrial machines and screw sizes which may reduce changeover time, improve the ergonomics and labor to remove the screw from the barrel, and/or provide a support structure for the tools used to clean the barrel.

SUMMARY

In an embodiment, a support cart for a machine screw, such as an extruder or injection molding screw, may comprise a frame and a plurality of trolleys. The frame may have a pair of tracks and a caster assembly. The caster assembly may have a first position where the frame does not contact a surface (e.g., floor) below the support cart and the frame is movable. The caster assembly may also have a second position where the frame contacts the surface (e.g., floor) below the support cart and, as a result, the frame is substantially stationary. Each trolley of the plurality of trolley may include a base, an adjuster, a support plate, and a plurality of rollers. Each trolley may be movable along the tracks of the frame via the plurality of rollers. Each trolley may have a height adjustable support plate relative to the base, adjustable by the adjuster.

Various aspects of the present disclosure will become apparent to those skilled in the art from the following detailed description of the embodiments, when read in light of the accompanying drawings.

BRIEF DESCRIPTION OF THE DRAWINGS

Embodiments of the invention will now be described, by way of example, with reference to the accompanying drawings, wherein.

DETAILED DESCRIPTION

Various embodiments are described herein of various apparatus and/or systems. Numerous specific details are set forth to provide a thorough understanding of the overall structure, function, manufacture, and/or use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," "an embodiment," "an exemplary embodiment," or the like, means that a particular feature, structure, or characteristic described in connection with the embodiment is included in at least one embodiment. Thus, appearances of the phrases "in various embodiments," "in some embodiments," "in one embodiment," "in an embodiment," "in an exemplary embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation given that such combination is not illogical or non-functional.

Figure 1:
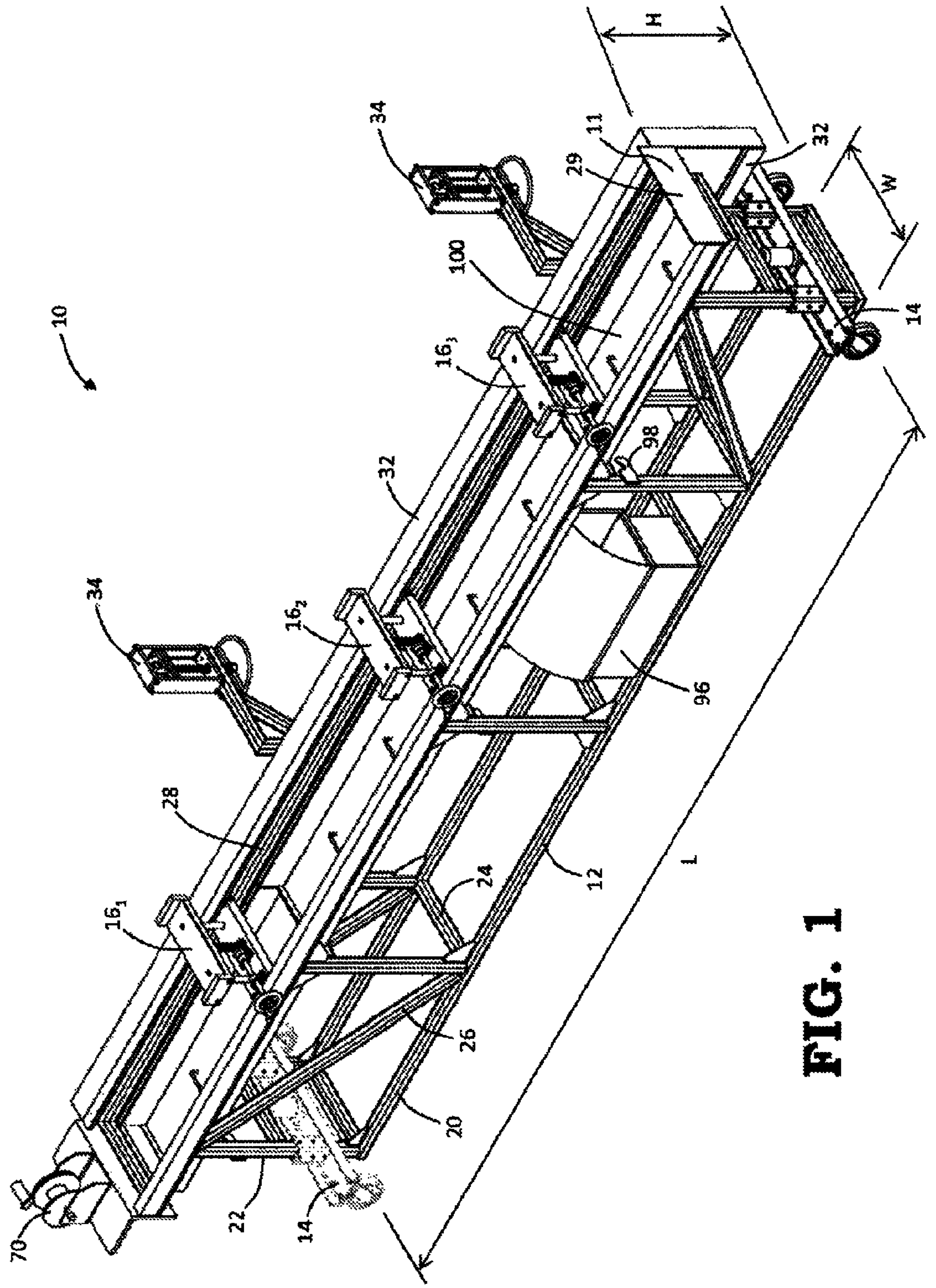
FIG. 1 is an isometric view of an embodiment of a support cart.

Referring now to the drawings wherein like reference numerals are used to identify identical or similar components in the various views, FIG. 1 generally illustrates an embodiment of a support cart, indicated generally at 10. Generally, the support cart 10 may be movable and may be positioned next to industrial machinery, such as but not limited to, an extrusion machine and an injection molding machine. The machinery may have a barrel and a screw within the barrel. When required, the screw may be removed from barrel. To assist with supporting the screw during and after removal of the screw from the barrel, the support cart 10 may be positioned such that a length L of the support cart 10 is substantially aligned with a central axis of a screw and an end 11 of the support cart 10 is proximate to an end of a barrel. After positioning, the support cart 10 may configured to be substantially stationary (i.e., nonmovable). The screw may be removed from the barrel and supported on the support cart 10. While the screw is removed from the barrel and on the support cart 10, the screw and the barrel may be cleaned. In an embodiment, the support cart 10 may comprise a frame 12, a caster assembly 14, and a plurality of trolleys $\mathbf{16}_{1-N}$.

Figure 2A:
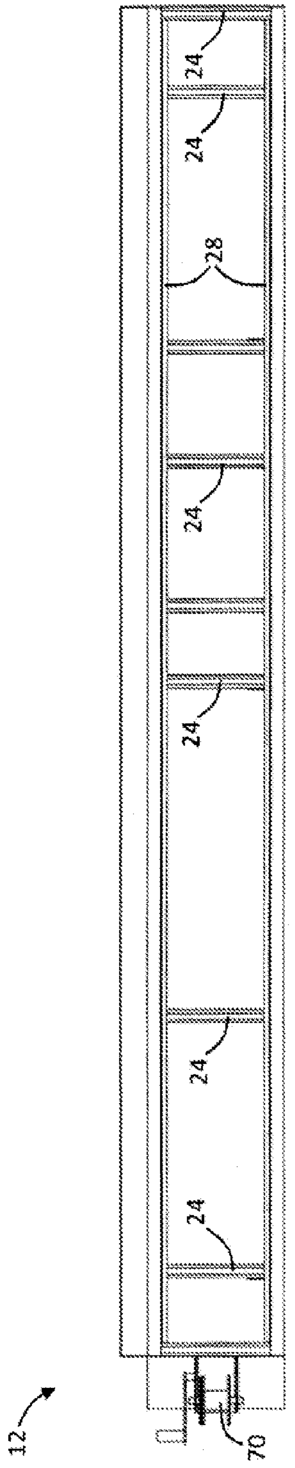
FIGS. 2A and 2B are a top view and a side elevation view, respectively, of an embodiment of a frame of the support cart of FIG. 1.
Figure 2B:
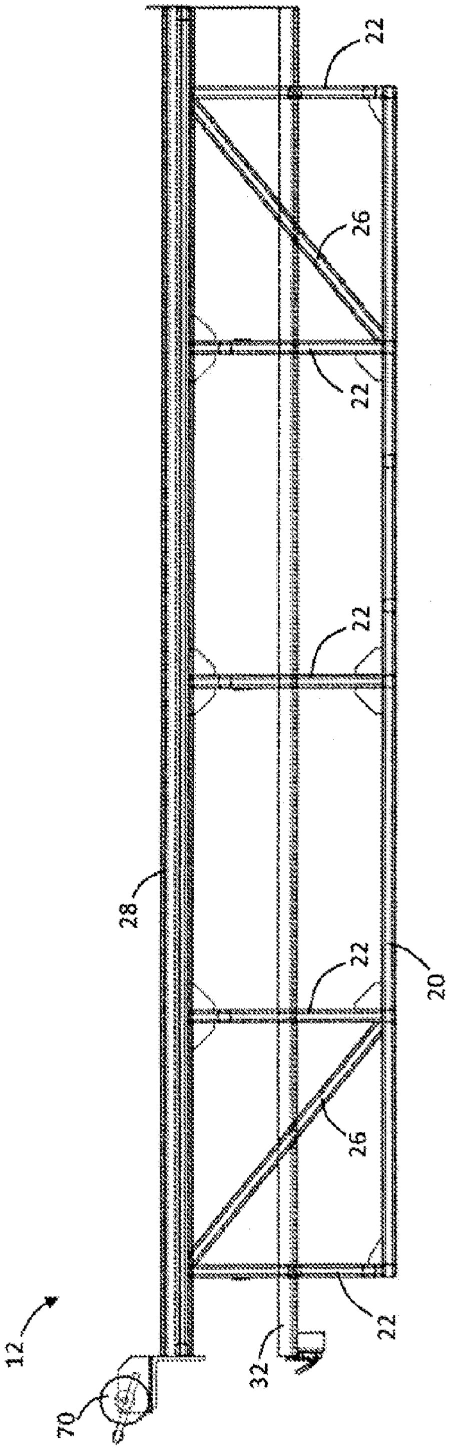
Figure 3B:
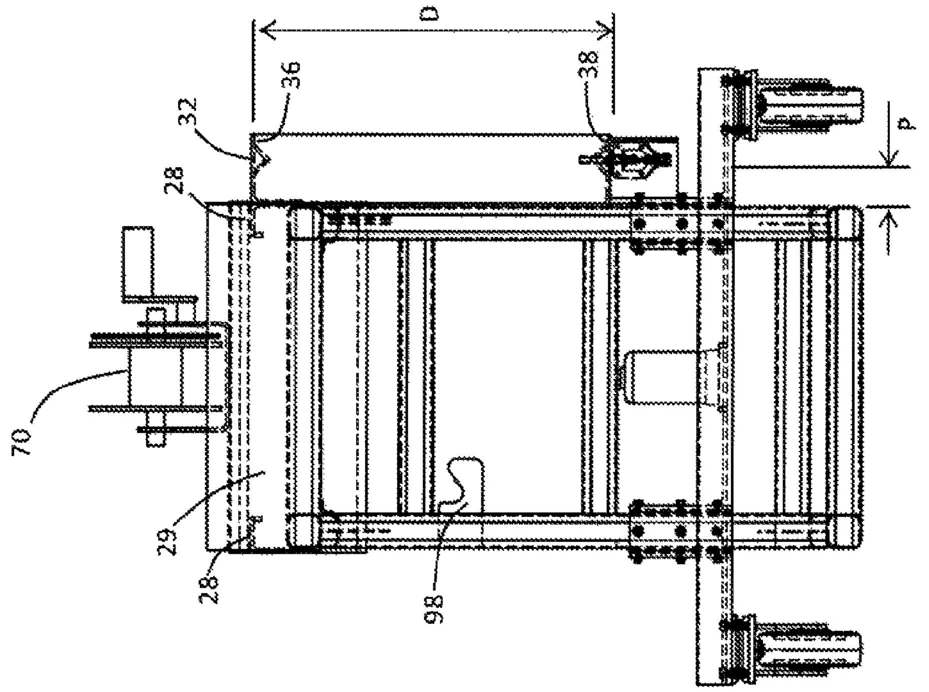
FIGS. 3A and 3B are a cross-sectional first side view and a second side view, respectively, of the support cart of FIG. 1.
Figure 3A:
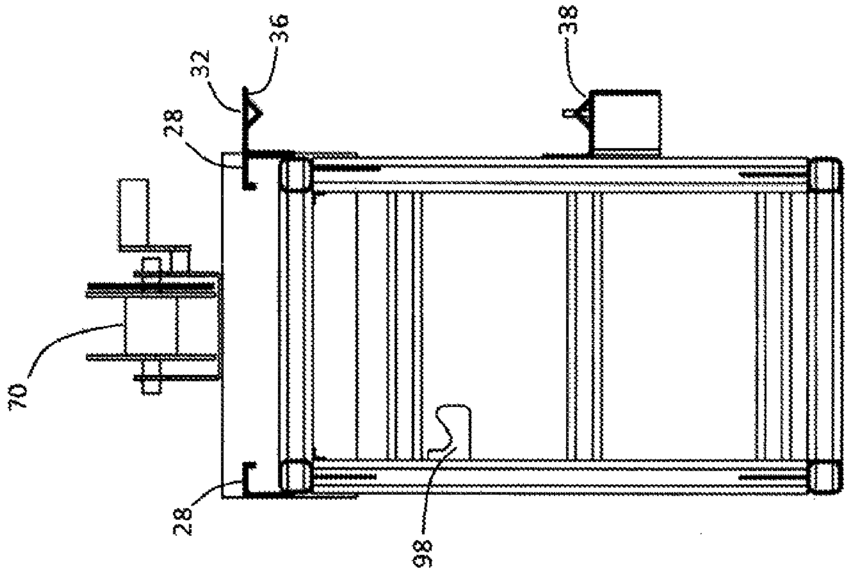
Figure 3C:
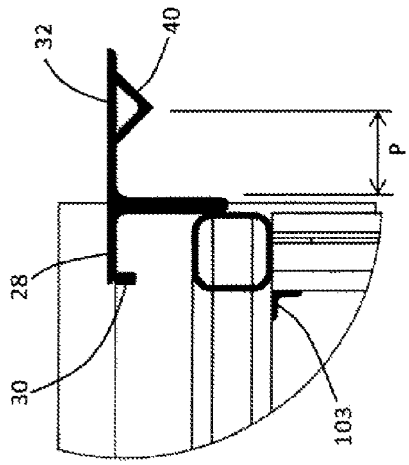
FIGS. 3C and 3D are enlarged partial views of the cross-sectional side view of FIG. 3A, generally illustrating a cross-sectional profile of a first set of tracks and a second set of tracks.
Figure 3D:
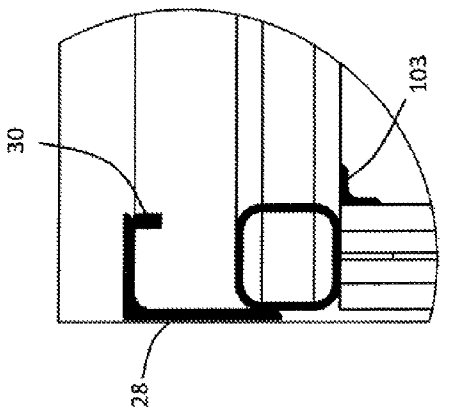

As generally illustrated in FIGS. 1, 2A, and 2B, the frame 12 may be a structural assembly that may be substantially rectangular in shape. The structural assembly may comprise of a plurality of members. The structural assembly may comprise of a plurality of members. In an embodiment, the members may be tubular and may have a cross section that is square or round. For example, in an exemplary embodiment, the tubing may have a 2 inch by 2 inch square cross-sectional area. While detailed embodiments of the cross section of the members is provided, it will be appreciated that other types of members may be utilized as known to those with skill in the art. For example, and without limitation, the members may have a cross-sectional area that may be I-shaped, L-shaped, U-shaped, rectangular, or circular. The members may comprise of metal, such as but not limited to steel or aluminum. Metal may provide an adequate amount of weight to keep the frame 12 stationary when positioned next to the industrial machine during removal or insertion of the screw into the barrel.

The members may be arranged in various configurations to create an effective structural assembly that may be strong enough to support the screw, or a plurality of screws, yet light enough to be maneuverable by an operator. For example, in one exemplary embodiment, the frame 12 may be comprised of a plurality of horizontal members 20, a plurality of vertical members 22 connecting the horizontal members 20, and a plurality of cross members 24 that connect either, or both, the horizontal members 20 and the vertical members 22. Additionally, in an embodiment, the frame 12 may also have a plurality of diagonal members 26. The diagonal members 26 may create a truss-style structure which may provide additional structural support.

In embodiments, a frame 12 may have a width W, height H, and length L (in various embodiments, the length L of the support cart 10 and the frame 12 may be approximately the same). The length L may be the longest dimension relative to the width W and the height H. In one embodiment, the length L of the frame 12 may be approximately a length of the horizontal members 20. The frame 12 may be configured so that the length L is at least as long as the screw which may be placed on the support cart 10. In an embodiment, the width W of the frame 12 may be approximately a length of the cross members 24 plus the cross-sectional width of two of the horizontal members 20. The frame 12 may be configured so that the width W is at least wide enough to accommodate a plurality of screws positioned adjacent to each other. In an embodiment, the height H of the frame 12 may be approximately a length of the vertical members 22 plus the cross-sectional width of two of the horizontal members 20. The frame 12 may be configured so that the height H of the frame 12 is adjustable and/or may be configured so that the height H is below the aperture of the barrel, allowing the screw to be placed on top of the support cart 10 when the support cart 10 is placed near the industrial machine, such as an extruder or injection molding machine. For example, and without limitation, in an embodiment, the frame 12 may have a width W of approximately twenty (20) inches, a height H of approximately thirty-four (34) inches, and a length L of approximately two-hundred and six (206) inches. While detailed dimensions of the cross section of the members, width W, height H, and length L have been provided and generally illustrated, it will be appreciated that the dimensions of the frame 12 are not so limited, and other dimensions may be utilized as known to those with skill in the art.

As generally illustrated in FIGS. 3A-3D, the frame 12 may have a first set of tracks 28 located proximate the two uppermost horizontal members 20, for example, one track 28 on each uppermost horizontal member 20. The tracks 28 may be oriented substantially parallel to the horizontal members 20 and may be approximately as long in length as the horizontal member 20. The cross section of the tracks 28 may have a portion that is U-shaped. The opening of the U-shape may be sideways and directed toward the other track 28. The distance between the two tracks may be approximately the same as the width W of the frame 12. In an embodiment, the distance between the two tracks 28 may be approximately twenty (20) inches. In an embodiment, the tracks 28 may also include a protrusion 30. The protrusion 30 may limit the opening of the U-shape and can be configured to retain an object within the track 28. For example, in an embodiment, the first set of tracks 28 may be used by the plurality of trolleys $\mathbf{16}_{1-N}$, which will be described in further detail later. In an embodiment, the frame 12 may have a removable end plate 29 at either end of the frame which may provide a stopping point for objects using the first set of tracks 28. The end plate 29 may be easily removed in order to allow the addition or removal of objects using the first set of tracks 28, such as but not limited to, the trolleys 16.

The frame 12 may have a second set of tracks 32. The second set of tracks 32 may be configured to receive a brush support assembly 34, which will be described in further detail below. The second set of tracks 32 may project horizontally off one of the sides of the frame 12. The second set of tracks 32 may comprise an upper track 36 and a lower track 38. The upper track 36 may be oriented adjacent to one of tracks 28 from the first set of tracks 28. The lower track 38 may be substantially parallel to the upper track 36, located on the same side of the frame 12 as the upper track 36, and project off the side of the frame 12 approximately the same amount. In an embodiment, the cross-sectional area of the second set of tracks 32 may be generally L-shaped. One leg of the L-shaped track 32 may be attached or connected to the frame 12 or one of the tracks 28 of the second set of tracks 28. The other leg of the L-shaped track 32 may project horizontally off the side of the support cart 10. The second set of tracks 32 may have a raceway 40 (e.g., triangular raceway) provided on horizontally projecting legs, such that two raceways 40 face one another. In an embodiment, the raceway 40 may comprise angle metal having dimensions of 1.25×1.25×0.1875 inches and may be 206 inches in length. The triangular raceways 40 may be oriented substantially parallel to the horizontal members 20 of the frame 12. In an embodiment, a distance D between the projecting legs of the upper track 36 and lower track 38 may be approximately 20.375 inches. In an embodiment, the peak of the triangular raceway 40 may be located a horizontal distance P of approximately 2.5 inches away from the side of the frame 12 or the vertical leg of the L-shaped track 32. While detailed dimensions have been described and generally illustrated, the present disclosure is not so limited. Other shapes and dimensions may be used as appropriate and as generally known to those with skill in the art and remain within the scope and spirit of the present disclosure.

Figure 4A:
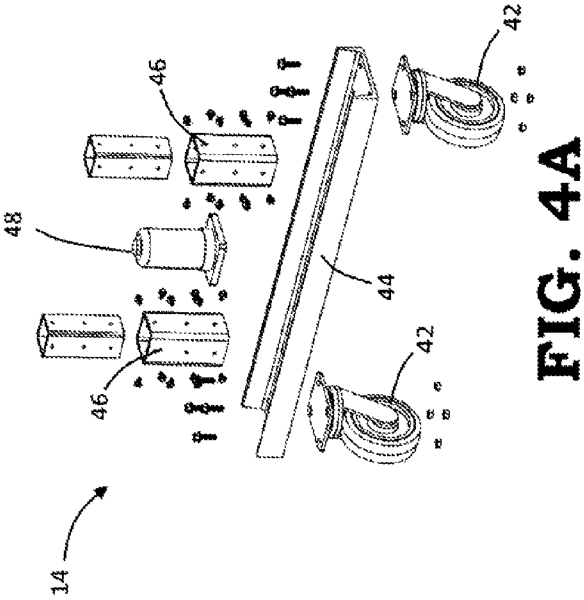
FIGS. 4A and 4B are an exploded view and a side view, respectively, of an embodiment of a caster assembly of the support cart of FIG. 1.
Figure 4B:
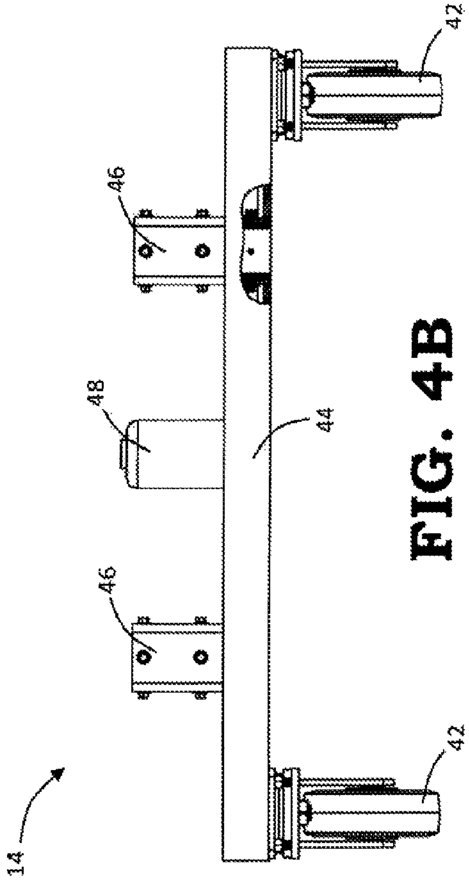

As generally illustrated in FIGS. 1, 4A, and 4B, a caster assembly 14 may provide mobility to the support cart 10. For example, and without limitation, a pair of caster assemblies 14 may be respectively attached to opposite ends of the frame 12. For purposes of simplicity, one caster assembly 14 will be described relative to the attachment to one end of the frame 12. It should be appreciated, however, that the following disclosure may apply to either end of the support cart 10, and other configurations and modes for mobility of the cart.

The caster assembly 14 may, for instance, comprise a pair of wheels (i.e., casters) 42, a support bracket 44, a pair of channel sleeves 46, and a jack 48. The wheels 42 may be attached proximate the ends of the support bracket 44, one wheel 42 for each end of the support bracket 44. The support bracket 44 may be oriented substantially parallel to a cross member 24. In an embodiment, the support bracket 44 may be U-shaped such that the support bracket 44 may be rigid and stiff to support the weight of the support cart 10 and the various screws that may be placed on the support cart 10 without any substantial permanent deformation to the support bracket 44. The support bracket 44 may be wider than the frame 12, where each end of the support bracket 44 symmetrically extends beyond the width of the frame 12. The wider width of the support bracket 44 relative to the frame 12 may provide a stable base for the support cart 10 and may assist in preventing the support cart 10 from inadvertently tipping over. In an embodiment, the support bracket 44 may be approximately forty-five (45) inches wide. In the embodiment where the width W of the frame 12 is approximately 20 inches, the support bracket 44 may be wider than the frame 12 and have a width of twenty-five (25) inches. In other words, the support bracket 44 may extend beyond the frame 12 by twelve and a half (12.5) inches on each side of the frame 12. While detailed dimensions of the support bracket 44 have been described and generally illustrated, the present disclosure is not so limited. Other dimensions may be used as appropriate and as generally known to those with skill in the art and remain within the scope and spirit of the present disclosure.

The channel sleeves 46 may be attached to the support bracket 44 and may be symmetrically positioned relative a middle point of the support bracket 44. A pair of vertical members 22 of the frame 12 may pass through the pair of channel sleeves 46 and a pair of clearance holes in the support bracket 44. The inner opening of the channel sleeves 46 may be sized such that the inner opening is slightly larger than the outer cross-sectional dimensions of the vertical members 22. This may allow the interaction of the vertical members 22 to act as guides and constrain the motion of the caster assembly 14 along an axis substantially parallel the length of the vertical members 22. In other words, the caster assembly 14 may move up and down relative to the vertical members 22 of the frame 12 only.

The caster assembly 14 may have a first position and a second position. The first position may cause the wheels to contact the floor and raise the frame 12 such that the frame 12 does not touch the floor. When both caster assemblies 14 at each end of the frame 12 are in the first position, the frame 12 may not touch the floor at any location, and the support cart 10 may be easily movable via the wheels 42 of the caster assembly 14. The second position may cause the wheels 42 to not contact the floor or at least the wheels 42 may not be bearing the majority of the weight of the support cart 10, and the frame 12 may contact the floor. When both caster assemblies 14 at each end of the frame 12 are in the second position, the frame 12 may engage the floor and the weight of the frame 12 may apply a force to the floor that makes the support cart 10 substantially immovable (e.g., stationary). This may be a preferred position when an operator is transferring a screw to or from the support cart 10 because the support cart 10 in the second position may create a stationary and stable platform. The caster assembly 14 may be moved to either the first or second positions via a jack 48. The jack 48 may be positioned proximate the midpoint of the support bracket 44. The jack 48 may have one end engaged with the support bracket 44 and another end engaged with the frame 12. To move the caster assembly 14 to either the first or second position, the jack 48 may be actuated to raise or lower the caster assembly 14 relative to the frame 12. In an embodiment, the jack 48 may be a hydraulic bottle jack. In an embodiment, the jack 48 may have at least about a two ton capacity. Although an embodiment of the jack 48 is described in detail, other actuation lifting devices may be used, such as but not limited to, pneumatic actuators, electric actuators, and other actuators known to those with skill in the art, and remain within the scope and spirit of the current disclosure.

Figure 5A:
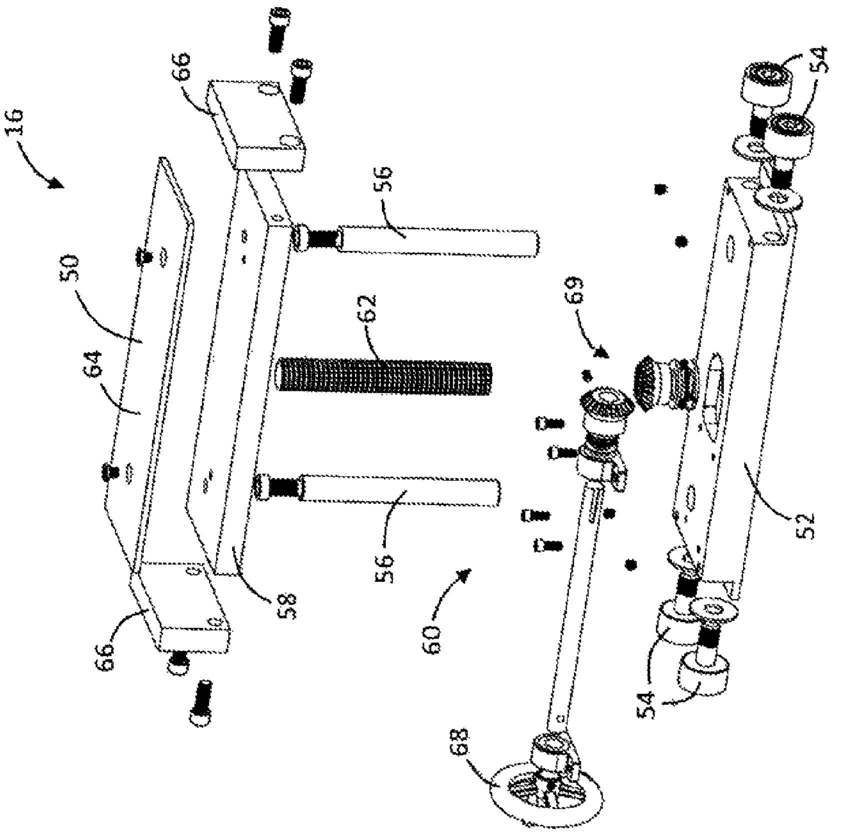
FIGS. 5A and 5B are an exploded view and an isometric view, respectively, of an embodiment of a trolley associated with a support cart the type shown in FIG. 1.
Figure 5B:
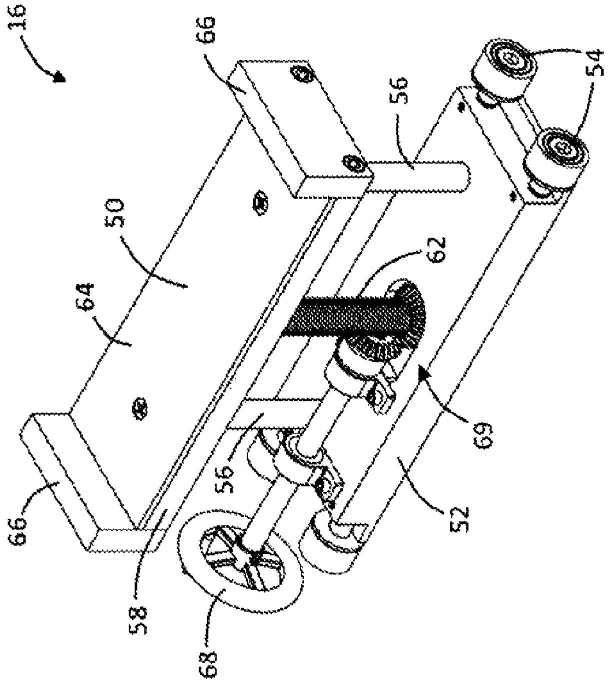
Figure 6:
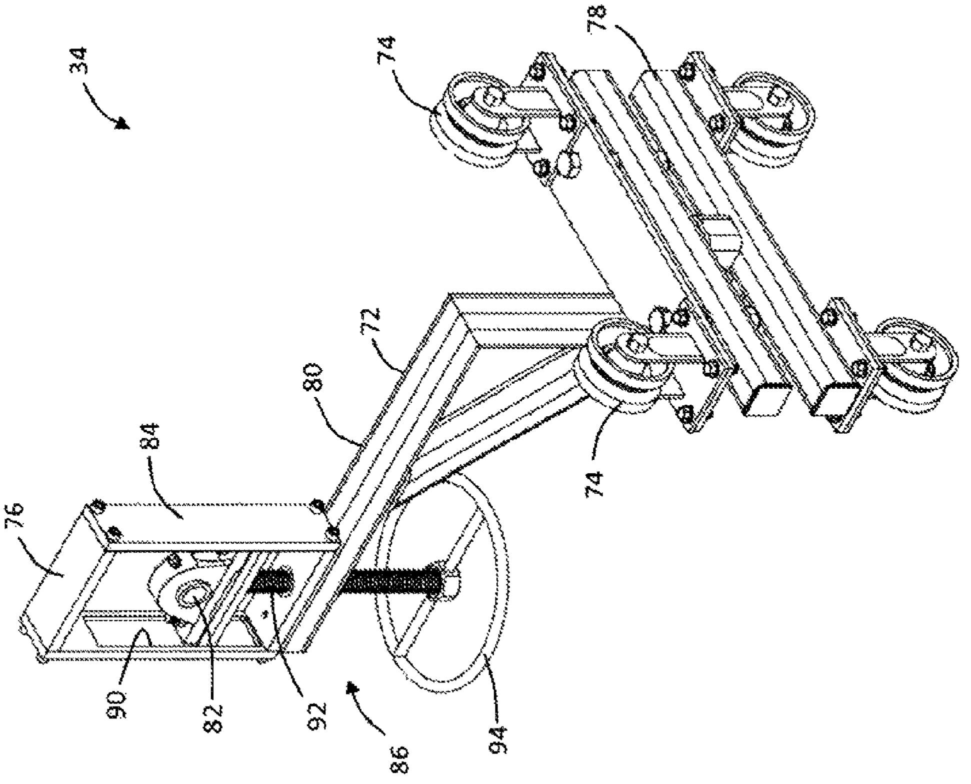
FIG. 6 is an isometric view of an embodiment of a brush support assembly of the support cart of the type shown in FIG. 1.
Figure 7B:
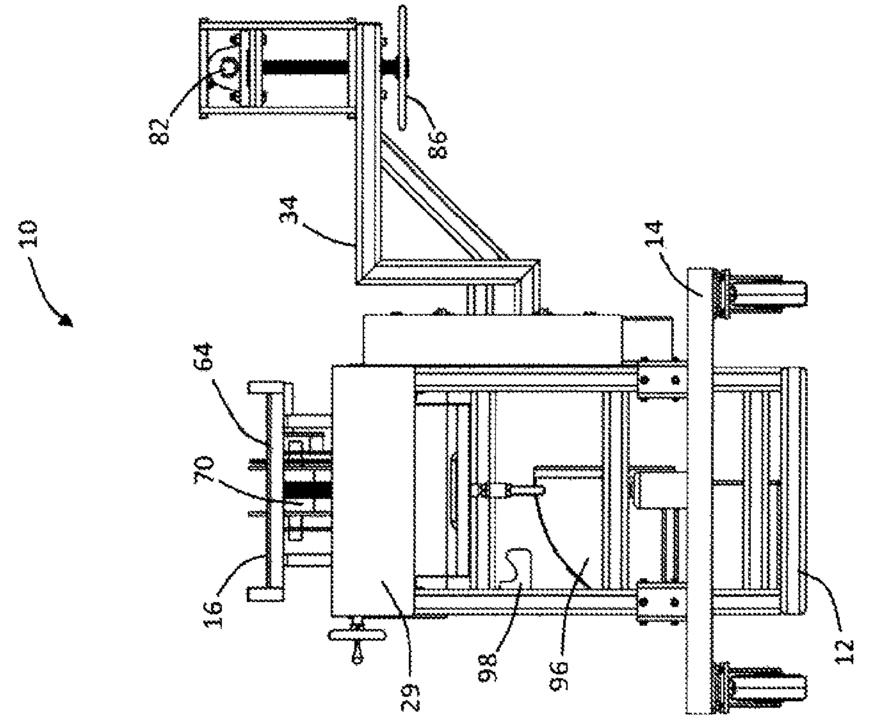
FIGS. 7A and 7B are side views of the support cart of FIG. 1, generally illustrating various positions of the trolley and the illustrated brush support assembly.
Figure 7A:
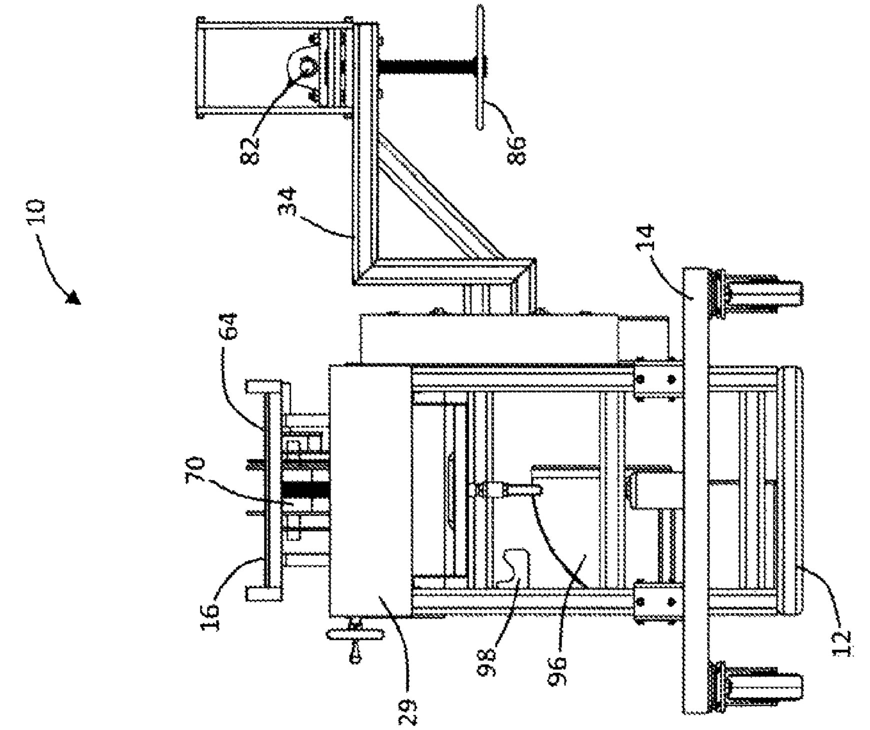
Figure 8A:
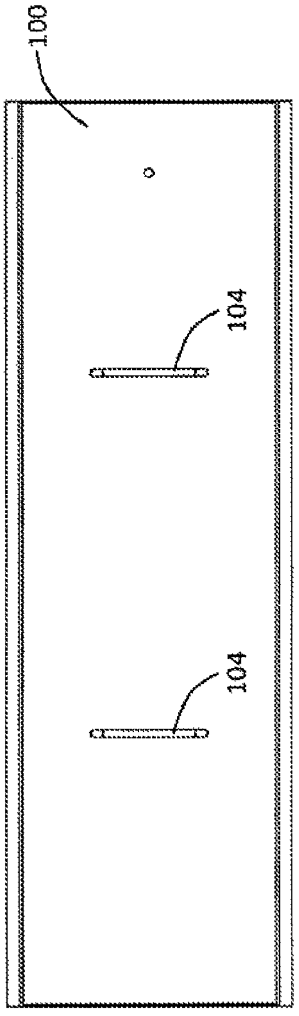
FIGS. 8A, 8B, and 8C are a top view, side view, and front view, respectively, of an embodiment of a removable tray of the support cart of FIG. 1.
Figure 8C:
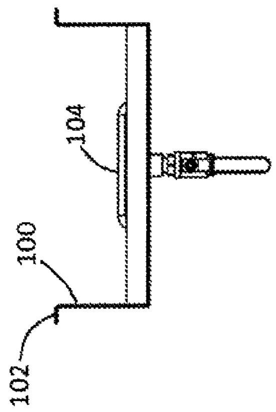
Figure 8B:
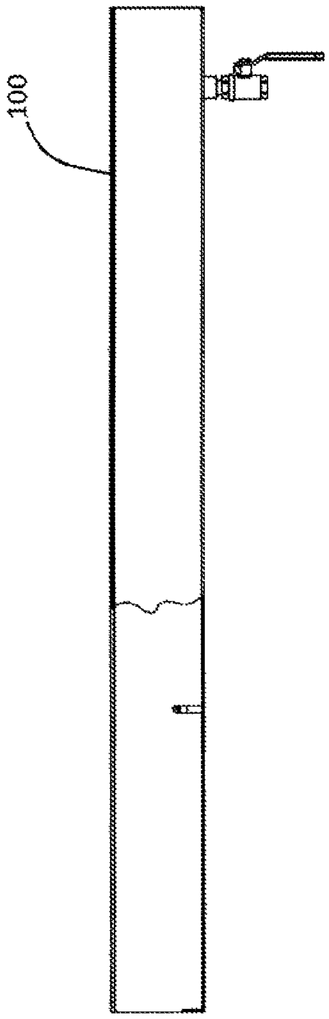

As generally illustrated in FIGS. 1, 5A, and 5B, the plurality of trolleys $\mathbf{16}_{1\text{-}N}$ may provide a support surface 50 which may engage and support the screw and/or screws. Each trolley 16 may move laterally along the first set of tracks 28 on the frame 12. Each trolley 16 may also be adjustable to increase or decrease the height of the support surface 50 to contact and bear the weight of the screw or eliminate contact and weight bearing of the screw, as necessary. For example, in an embodiment, the plurality of trolleys $\mathbf{16}_{1\text{-}N}$ may comprise a first trolley $\mathbf{16}_1$, a second trolley $\mathbf{16}_2$, and a third trolley $\mathbf{16}_3$. When the support cart 10 is positioned such that an end 11 of the support cart 10 is proximate to the aperture of the barrel, the third trolley $\mathbf{16}_3$ may be closest to that end 11 of the support cart 10. The first trolley $\mathbf{16}_1$ may be closest to the opposing end of the support cart 10. The second trolley $\mathbf{16}_2$ may be between the first trolley $\mathbf{16}_1$ and the third trolley $\mathbf{16}_3$. While a detailed embodiment discloses the use of three trolleys, it will be appreciated that the disclosure is not so limited. Rather, any number of trolleys may be used and remain within the scope and spirit of the present disclosure.

Each trolley 16 may comprise a base 52, a plurality of rollers 54, a guide 56, a support plate 58, and an adjuster 60. In an embodiment, the base 52 may be substantially rectangular in shape. The base 52 may be positioned between the first set of tracks 28. The base 52 may have a pair of clearance through holes configured to slidably locate a guide 56 or pair of guides 56. The base 52 may have a threaded hole configured to receive a corresponding threaded shaft 62 of the adjuster 60.

In an embodiment, a pair of rollers 54 may be attached to each end of the base 52. Use of the pair of rollers 54 on each end of the base 52 may keep the base stable when the trolley 16 is engaged in the first set of tracks 28. In an embodiment, the rollers 54 may be positioned to engage each track 28 of the first set of tracks 28. The tracks 28 may have a retention feature 30, such as the protrusion 30 that may aid the rollers 54 to remain located within the tracks 28 and additionally provide a smooth motion along the linear path aligned with the tracks 28. In an embodiment, a total of four rollers 54 may be used, two on each side of the base 52. In other embodiments, the rollers 54 may be replaced with a slide, or one roller/locator, or other sliding/locating devices as known to those with skill, which may achieve a stable base yet allow the trolley to locate and move within the first set of tracks.

The support plate 58 may be positioned above the base 52. In an embodiment, the support plate 58 may be substantially rectangular in shape. The support plate 58 may have a wear plate 64 placed on a top surface of the support plate 58. A top surface of the wear plate 64 may act as the support surface 50 that may contact the screw when the screw is placed on the trolley 16. In an embodiment, the wear plate 64 may be made of a material that does not damage the screw. In an embodiment, the support plate 58 may also have a pair of side plates 66 attached to the ends of the support plate 58 that may be used to retain the screw along the support surface 50. In another embodiment, the support plate 58 may have the feature of the side plates 66 integrated with the support plate 58, such as a cutout forming a U-shape on the top surface of the support plate 58.

A guide 56 or a pair of guides 56 may be attached to the support plate 58. As used herein, guide 56 or pair of guides 56 will be referred to as a guide 56. In an embodiment, the guide 56 may be cylindrical in shape. The guide 56 may pass through a corresponding clearance through hole located in the base 52. The guide 56 may constrain the motion of the support plate 58 such that any corresponding lateral movement of the base 52 may move the support plate 58 along with the base 52, but also allow the support plate 58 to vertically move up or down relative to the base 52 along a path aligned with the guide 56.

The adjuster 60 may comprise a handle 68, a gear assembly 69, and the threaded shaft 62. The threaded shaft 62 may operate within the corresponding threaded hole in the base 52. The threaded shaft 62 may be rotated by an operator via rotation of the handle 68. The handle 68 may be operatively connected to the threaded shaft 62 via the gear assembly 69. In the illustrated embodiment, for example, the gear assembly 69 can be a bevel gear assembly. Thus, as the handle 68 is rotated, the threaded shaft 62 will go up or down, depending on the direction of the rotation.

As generally illustrated in FIG. 1, the support cart 10 may include a pulling device, such as a winch 70. In the illustrated embodiment, the winch 70 may be attached to an end of the support cart 10, opposite the end 11 of the support cart 10 configured to be proximate to the barrel of the industrial machine. The winch 70 may be configured to assist in removing the screw from the barrel. For example, in an embodiment, a cable from the winch 70 may be attached directly or indirectly to the screw and/or screw puller bracket, and actuation of the winch 70 may provide a necessary force (or partial force) to move the screw from the barrel. Utilization of a winch 70 or similar device may not be necessary if the screw does not require additional force in the removal efforts than what may be typically required.

As generally illustrated in FIGS. 1, 6, 7A, and 7B, the support cart 10 may also include a pair of brush support assemblies 34, although any number of brush support assemblies 34 may be provided. The illustrated brush support assemblies 34 may be similar to one another and, therefore, only one brush support assembly 34 will be described in further detail. The brush support assembly 34 may support the shaft of a cleaning brush used to clean the barrel. The brush support assembly 34 may reduce the amount of weight that an operator must carry when using the barrel brush. The brush support assembly 34 may also reduce the amount of vibration and other forces that an operator may endure while using the cleaning brush. The brush support assembly 34 may be quickly attached or detached from the support cart 10 by connecting the brush support assembly 34 to the support cart 10 via the second set of tracks 32 located on the side of the support cart 10. The brush support assembly 34 may be configured to move laterally along a path created by the direction of the second set of tracks 32. The brush support assembly 34 may comprise a brush support frame 72, a set of casters 74, and a shaft support 76. In an embodiment, the brush support frame 72 may comprise aluminum tubing. While aluminum tubing is described in detail such that the brush support assembly 34 may be reduced in weight, it will be appreciated that other materials as known to those of skill in art may be used and remain with the scope and spirit of the present disclosure.

The brush support frame 72 may comprise a base portion 78 and an extension portion 80. The base portion 78 may provide structure for attachment and positioning of a set of casters. In an embodiment, the base portion 78 may be generally H-shaped where the H is turned sideways (i.e., generally horizontal). The extension portion 80 may project from the base portion 78. In an embodiment, the extension portion 80 may project substantially perpendicular to the base portion 78. In an embodiment, the extension portion 80 may be approximately L-shaped and may have a diagonal support member attached to the two legs of the L-shape. In an embodiment, the projection of the extension portion 80 from the base portion 78 may be approximately 25 inches. One of the legs of the extension portion 80 may be oriented so that it is substantially horizontal and also substantially parallel to the cross members of the frame 12 of the support cart 10.

The set of casters 74 may be configured to engage the second set of tracks 32. In an embodiment, the set of casters 74 may be V-groove wheel track casters and configured to engage a raceway 40 (e.g., a triangular raceway) of the second set of tracks 32. The set of casters 74 may be attached to the base portion 78 of the brush support frame 72, where one caster 74 may be located proximate to each of the four ends of the base portion 78. In an embodiment the casters 74 may be a four (4) inch V-groove track caster. While a detailed description on a various embodiment of a caster is disclosed, it will be appreciated that this disclosure is not so limited. Other types of casters may be utilized as known to those with skill in the art and remain with the scope and spirit of the present disclosure.

The shaft support 76 may comprise a bearing 82, a housing 84, and an adjuster 86. The bearing 82 may engage the shaft of the cleaning brush used to clean the barrel. The shaft of the cleaning brush may have an end configured to engage a chuck of a drill motor. The shaft of the cleaning brush may be passed through an opening of the bearing 82 before engaging the drill motor chuck. In other words, the bearing 82 of the shaft support 76 may be between the end of the shaft of the cleaning brush and a brush portion located on an opposing end of the cleaning brush. The bearing 82 may have an inner race that may rotate with the shaft of the cleaning brush when the drill motor rotates the shaft. In an embodiment, the bearing 82 may be a cast iron base-mounted steel ball bearing. The housing 84 may surround the bearing 82. The housing 84 may be configured to constrain the motion of the bearing 82 such that the bearing 82 may be adjusted up and down only. The housing 84 may have a pair of recesses 90, where an end of the bearing 82 is located in the recess 90. The adjuster 86 may comprise a threaded shaft 92 and a handle 94. The threaded shaft 92 may engage a threaded hole located either in the housing 76 or the extension portion 80 of the brush support frame 72. An end of the threaded shaft 92 may be connected to the bearing 82 and the handle 94 may be connected to the opposing end of the threaded shaft 92. When the handle 94 is rotated, the threaded shaft 92 may also rotate, which may raise or lower the bearing 82 within the housing 76, depending on the rotation direction. In an embodiment, the bearing 82 may be adjusted vertically up to approximately six inches. In an embodiment, the bearing 82 may have a range of approximately 40.6 to 46.6 inches off the floor, although the bearing 82 may be adjustable any height from the floor. The adjustment of the bearing 82 height may be done to approximately align the bearing 82 centerline to the barrel centerline.

The support cart 10 may further comprise a toolbox 96. The toolbox 96 may be used to store various tools used in the removal and insertion of a screw from or to the barrel. In an embodiment, the toolbox 96 may be attached or connected to the frame 12 of the support cart 10. The toolbox 96 may be attached to various horizontal members 20, cross members 24, or vertical members 22. The support cart 10 may also comprise a barrel brush mounting 98. In an embodiment, the barrel brush mounting 98 may comprise of a plurality of hook-shaped projections that may be attached to the vertical members of the frame 12. The hook-shaped projections may be configured to support the barrel brush for storage purposes. This may allow the barrel brush to be conveniently located during the screw changeover.

As generally illustrated in FIGS. 1, 3D, 8A, 8B, and 8C, the support cart 10 may further comprise at least one removable tray 100. The removable tray 100 may be located under the plurality of trolleys $\mathbf{16}_{1\text{-}N}$, but out of the path of the lateral motion of the plurality of trolleys $\mathbf{16}_{1\text{-}N}$. In an embodiment, the removable tray 100 may be generally U-shaped. The removable tray 100 may have a flange 102 at the ends (e.g., top of the U-shape) that may be used to catch a corresponding flange 103 on the frame 12 to position and locate the removable tray 100. In an embodiment, the removable tray 100 may have a handle 104 or a plurality of handles 104 to provide a hand-hold on the removable tray 100. In an embodiment, the removable tray 100 may comprise stainless steel material and may have a twelve (12) gage thickness. In an embodiment, the support cart 10 may have a plurality of removable trays 100. For example, in an embodiment, the support cart 10 may have four or more removable trays 100. The removable trays 100 may be used to capture debris, such as but not limited to, plastic resin that is removed from the screw. While detailed dimensions and materials have been provided to describe and generally illustrate an embodiment of the removable tray 100, the dimensions and materials are not so limited. Other dimensions and materials may be used as known to those with skill in the art and remain within the scope and spirit of the present disclosure.

A method of using the support cart 10 will now be described. When the caster assemblies 14 are in the first position, the support cart 10 may be positioned adjacent to an industrial machine requiring a screw changeover and/or maintenance. The support cart 10 may be aligned such that a first set of tracks 28 are approximately parallel to a centerline axis of a barrel. The support cart 10 may then be made stationary, for example, by moving the caster assemblies 14 to the second position, which may lower the frame 12 onto the floor. The plurality of trolleys $\mathbf{16}_{1\text{-}N}$ may be positioned toward the end 11 of the support cart 10 closest to the barrel and lowered as desired such that the screw, when pulled out, does not contact any of the trolleys 16. A screw tip bolt bracket puller may be put on the end of the screw and the screw may pulled out so that the screw is above the first trolley $\mathbf{16}_1$ (i.e., the trolley furthest away from the barrel). This may be approximately an "arms-length" in distance. If the screw does not pull out of the barrel easily, a cable from a pulling device, such as the winch 70, may be attached to the bolt bracket to assist in pulling the screw out of the barrel. The support plate 58 of the first trolley $\mathbf{16}_1$ may be raised to engage the screw and support at least a portion of the screw. The screw may then be pulled out an additional amount. This may cause the first trolley $\mathbf{16}_1$ to move with the screw. After the trolley is approximately half way out of the barrel, the support plate 58 of the second trolley $\mathbf{16}_2$ may be raised to engage another portion of the screw. The screw may then be pulled out an additional amount. Prior to the other end of the screw leaving the barrel, the support plate 58 of the third trolley $\mathbf{16}_3$ may be raised to engage yet another portion of the screw. The screw may then be pulled out of the barrel completely and the screw may be completely supported by the plurality of trolleys $\mathbf{16}_{1\text{-}N}$.

The caster assemblies 14 may then be moved back to the first position, allowing the allowing the frame 12 to no longer contact the floor, which may make the support cart 10 along with the screw movable. The support cart 10 along with the screw may then be easily transported for maintenance and/or cleaning.

Additionally, to assist with the cleaning of the barrel, the pair of brush support assemblies 34 may be placed into the second set of tracks 32. The support cart 10 may be moved such that the centerline of the bearing 82 is approximately in line with the center axis of the barrel. The bearing 82 may be adjusted vertically to fine tune the alignment of the centerline of the bearing 82 to the centerline axis of the barrel. An end of the cleaning brush (e.g., the wire brush portion) may be placed in the barrel and the other end of the cleaning brush (e.g., the shaft) may be placed through the bearing 82 and then attached to a motor, such as but not limited to a drill motor. The motor then rotates the barrel brush which causes the wire brush portion to spin in the barrel. The cleaning brush may be moved laterally in and out of the barrel, and the brush support assembly 34 may move along the second set of tracks while supporting the barrel brush shaft.

After the screw has been cleaned and/or maintenance performed on the screw has occurred, the screw may be placed back in the barrel by generally reversing the foregoing described steps. After the screw has been placed back inside the barrel, the removable tray(s) 100 may be taken off the support cart 10 and any debris caught in the removable tray(s) 100 disposed of accordingly. The removable tray(s) 100 may then be placed back on the support cart 10.

Although embodiments of this invention have been described above with a certain degree of particularity, those skilled in the art could make numerous alterations to the disclosed embodiments without departing from the spirit or scope of this invention. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A support cart for a machine screw, the support cart comprising:

a frame having a pair of tracks and a caster assembly, the caster assembly being operable between a first position wherein the frame does not contact a surface below the support cart and the frame is movable, and a second position wherein the frame contacts the surface below the support cart and the frame is substantially stationary; and a plurality of trolleys, wherein at least one trolley includes a base supported on a plurality of rollers, an adjuster, and a support bracket such that the at least one trolley is movable along the pair of tracks on the frame via the plurality of rollers, and a height position of the support bracket is adjustable relative to the base via the adjuster.

2. The support cart of claim 1, wherein the frame includes a pair of casters that are respectively located at opposite ends of the frame.

3. The support cart of claim 1, wherein the caster assembly includes a pair of wheels, a generally horizontal support bracket, and a pair of vertical channel sleeves coupled to the frame.

4. The support cart of claim 3, wherein the caster assembly further includes a jack for moving the caster assembly between the first position and the second position relative to the frame.

5. The support cart of claim 1, wherein the frame is supported on a plurality of wheels when the caster assembly is in the first position, and the frame is supported on a floor when the caster assembly is in the second position.

6. The support cart of claim 1, wherein the adjuster of at least one trolley includes a bevel gear assembly coupled between a threaded shaft and a rotatable handle to adjust the height of the support bracket.

7. The support cart of claim 1, wherein the frame further includes at least one brush support assembly.

8. The support cart of claim 7, wherein the at least one brush support assembly is movably supported on the frame by a second pair of tracks.

9. The support cart of claim 8, wherein the at least one brush support assembly includes a bearing for supporting a rotatable tool.

10. The support cart of claim 9, wherein the at least one brush support assembly further includes an adjuster to adjust a height of the bearing relative to the frame.

11. The support cart of claim 1, further including a winch supported at an end of the frame.

12. The support cart of claim 1, further including at least one removable tray supported on the frame under the plurality of trolleys.

13. A support cart for a machine screw, the support cart comprising:

a frame supported on a pair of caster assemblies, wherein the caster assemblies are operable between a first position such that the frame is movable along a support surface and a second position such that the frame is fixed in position on the support surface;

a plurality of trolleys movably supported on the frame, wherein the trolleys include a support bracket that is vertically adjustable relative to the frame; and at least one brush support assembly movably supported on the frame, wherein the brush support assembly includes a bearing for supporting a rotatable tool relative to the brush support assembly.

14. The support cart of claim 13, wherein each caster assembly includes a pair of wheels, a generally horizontal support bracket, and a pair of vertical channel sleeves coupled to the frame, and a jack for moving the caster assembly between the first position and the second position relative to the frame.

15. The support cart of claim 13, wherein the trolleys are movably supported on the frame by a first pair of tracks.

16. The support cart of claim 13, wherein each trolley includes a bevel gear assembly coupled between a threaded shaft and a rotatable handle to vertically adjust the support bracket.

17. The support cart of claim 13, wherein the at least one brush support assembly is movably supported on the frame by a second pair of tracks.

18. The support cart of claim 17, wherein the at least one brush support assembly further includes an adjuster to adjust a height of the bearing relative to the frame.

19. The support cart of claim 13, further including at least one removable tray supported on the frame under the plurality of trolleys.

20. A support cart for a machine screw, the support cart comprising:

a frame supported on a pair of caster assemblies and having a first set of tracks and a second set of tracks, wherein the caster assemblies are operable between a first position such that the frame is movable along a support surface and a second position such that the frame is fixed in position on the support surface;

a plurality of trolleys movably supported on first set of tracks, wherein each trolley includes a base supported on a plurality of rollers, an adjuster, and a support bracket, and the support bracket is vertically adjustable relative to the frame by the adjuster; and at least one brush support assembly movably supported on the second set of tracks, wherein the brush support assembly includes an adjuster and a bearing, and the bearing is vertically adjustable relative to the frame by the adjuster.

* * * * *